(12) United States Patent
Whelan

(10) Patent No.: US 8,739,912 B2
(45) Date of Patent: Jun. 3, 2014

(54) COMBINATION GOLF CART AND BAG

(76) Inventor: Howard Whelan, Burlington (CA)

( * ) Notice: Subject to any disclaimer, the term of this patent is extended or adjusted under 35 U.S.C. 154(b) by 153 days.

(21) Appl. No.: 13/227,528

(22) Filed: Sep. 8, 2011

(65) Prior Publication Data

US 2012/0061157 A1  Mar. 15, 2012

Related U.S. Application Data

(60) Provisional application No. 61/381,604, filed on Sep. 10, 2010.

(51) Int. Cl.
*B62D 1/28* (2006.01)

(52) U.S. Cl.
USPC ...... 180/168; 180/167; 180/54.1; 280/DIG. 5

(58) Field of Classification Search
USPC .............. 180/19.3, 6.5, 168, 19.1, 6.48, 332, 180/333, 167, 169; 296/201.31; 280/654–655, 645, 646–647, 642, 639, 280/47.17, 47.26, 47.315, DIG. 5
See application file for complete search history.

(56) References Cited

U.S. PATENT DOCUMENTS

| | | | | |
|---|---|---|---|---|
| 3,871,464 A | * | 3/1975 | Eden | 180/19.2 |
| 5,657,828 A | * | 8/1997 | Nagamachi | 180/19.3 |
| 5,944,132 A | * | 8/1999 | Davies et al. | 180/168 |

* cited by examiner

Primary Examiner — John Walters
Assistant Examiner — James Triggs

(57) ABSTRACT

A golf bag with an integral drive for propelling the golf bag, the golf bag includes a golf bag which includes an upper golf club housing connected to a lower drive housing. The golf bag includes an outer shell and includes internal frame components supporting the outer shell the frame components including a drive base connected to the bag for rigidly mounting drive components thereto. A drive including a motor mounted to the drive base, the motor operably connected to a drive axle which is connected to wheels for propelling the golf bag. Additionally there is control for controlling the function of the drive. Preferably the drive base separates the upper golf club housing from the lower drive housing.

5 Claims, 17 Drawing Sheets

COMBINATION GOLF CART AND BAG

The present application claims priority from US provisional application filed Sep. 10, 2010 under application no. 61/381,604 by Howard Whelan under the title Combination Golf Cart and Bag.

FIELD OF THE INVENTION

The present device relates to golf carts and bags in particular relates to a golf bag with drive used for the transportation and storage of golf clubs.

BACKGROUND OF THE INVENTION

Currently golf carts and golf bags are sold separately and in use a golf bag is normally demountably attached to the golf cart for use on the golf course.

There are also motorized golf carts that are available and again the present state of the art normally includes the use of a separate powered golf cart to which a golf bag is demountably attached.

The disadvantages of the current separate golf cart and golf bag arrangement is that for transportation purposes it is normally necessary to detach the golf cart from the golf bag and this is particularly true when the golf cart is of the motorized type. This requires numerous steps of folding and disassembly and removal of straps in order to dismount the golf bag from the golf cart.

In addition to the disadvantages faced by the user there are also cost disadvantages in that two separate components would need to be assembled and shipped namely a separate golf cart and/or powered golf cart and a golf bag for use with a golf cart. There are also issues in regards to compatibility between the golf bag and the golf cart even though manufacturers attempt to make them as universally acceptable as possible. Therefore there is a need for a combination golf cart and golf bag in which the two concepts are combined together in one neat package thereby reducing; the ultimate cost of manufacturing, the ultimate cost to the consumer, and creates simpler ease of use on the golf course as well as storage when not is use for the user of the combination golf cart and bag.

SUMMARY OF THE INVENTION

A golf bag with an integral drive for propelling the golf bag, the golf bag includes
  a) a golf bag which includes an upper golf club housing connected to a lower drive housing;
  b) the golf bag which includes an outer shell and includes internal frame components supporting the outer shell;
  c) the frame components including a drive base connected to the bag for rigidly mounting drive components thereto;
  d) a drive including a motor mounted to the drive base, the motor operably connected to a drive axle which is connected to wheels for propelling the golf bag.
  e) a control means for controlling the function of the drive.

The golf bag with an integral drive claimed in claim 1 wherein the drive base separates the upper golf club housing from the lower drive housing.

The golf bag with an integral drive wherein the drive base includes a top side which defines a bottom surface of the golf club housing for supporting butt ends of golf clubs thereon, and a bottom side for mounting the drive components thereon.

The golf bag with an integral drive wherein the frame components include a spine member rigidly connected to the drive base which extends upwardly along an inner surface of the golf bag outer shell for supporting the outer shell.

The golf bag with an integral drive wherein the frame components including at least one upright strut member rigidly connected to the drive base and extends upwardly along an inner surface of the golf bag outer shell for supporting the outer shell.

The golf bag with an integral drive wherein the spine and struts are operably connected to an inner surface of the outer shell for supporting and maintaining the shape of the outer shell.

The golf bag with an integral drive wherein the frame including a foldable handle connected pivotally at one end to a top of the spine member and at the other end to a grip.

The golf bag with an integral drive further including a drive end cap releasably attached to the drive base for covering the drive housing.

The golf bag with an integral drive further including a support arm with a support wheel attached at one end, and releasably attached to the drive base at the other end.

The golf bag with an integral drive wherein the control means further including a battery for supplying power to the drive.

BRIEF DESCRIPTION OF THE DRAWINGS

With the intention of providing demonstration of the characteristics of the device or method, an example is given below, without any restrictive character whatsoever, with reference to the corresponding figures, of a preferred embodiment of the device and method as follows.

DESCRIPTION OF THE PREFERRED EMBODIMENTS

Figure 1:
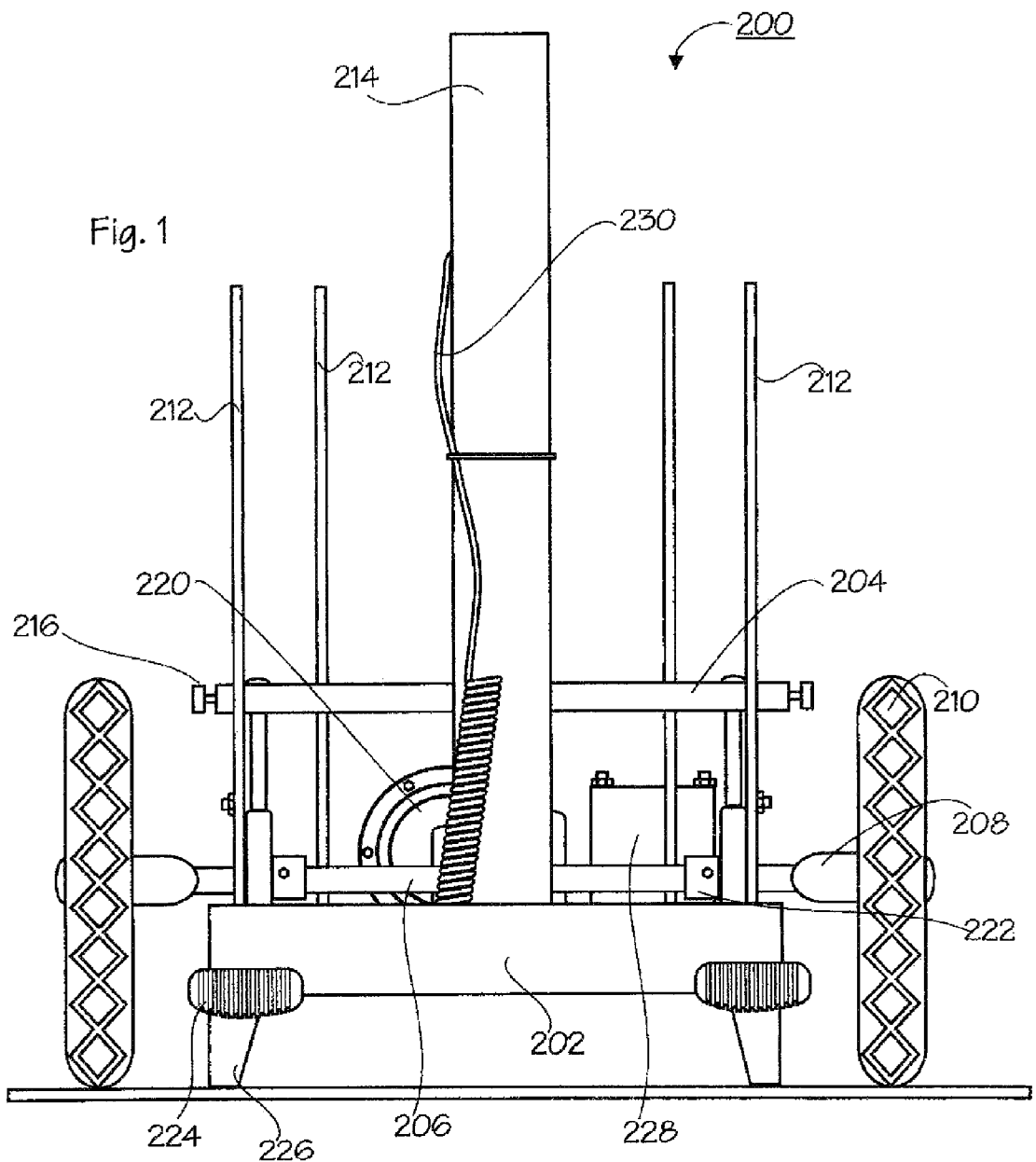
FIG. 1 is a front elevational view of the removable drive shown with wheels mounted on the hubs.
Figure 2:
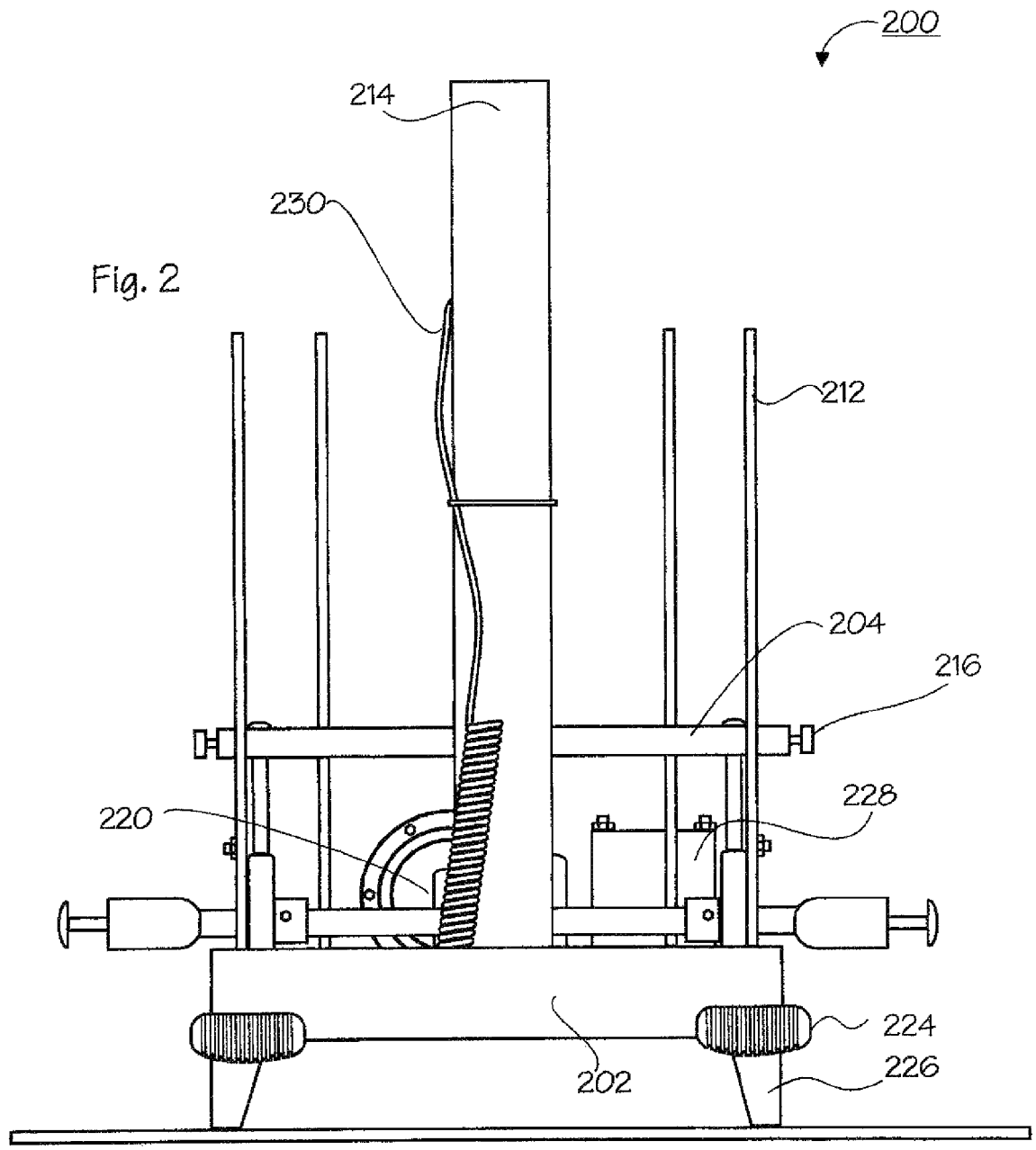
FIG. 2 is a front elevational view of the removable drive with the wheels removed from the hubs.
Figure 3:
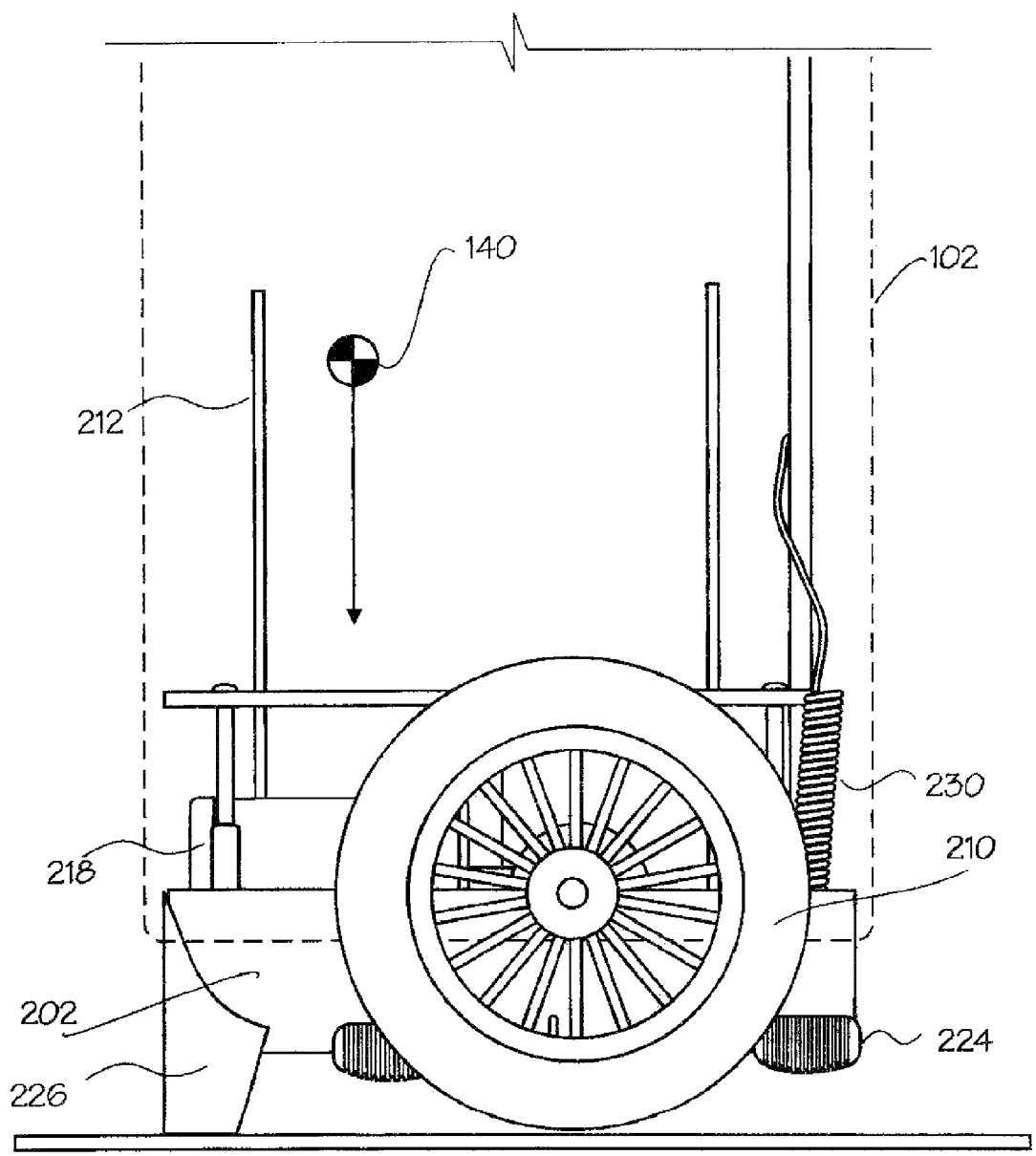
FIG. 3 is a partial side elevational view, of the removable drive with the heels mounted thereon.
Figure 4:
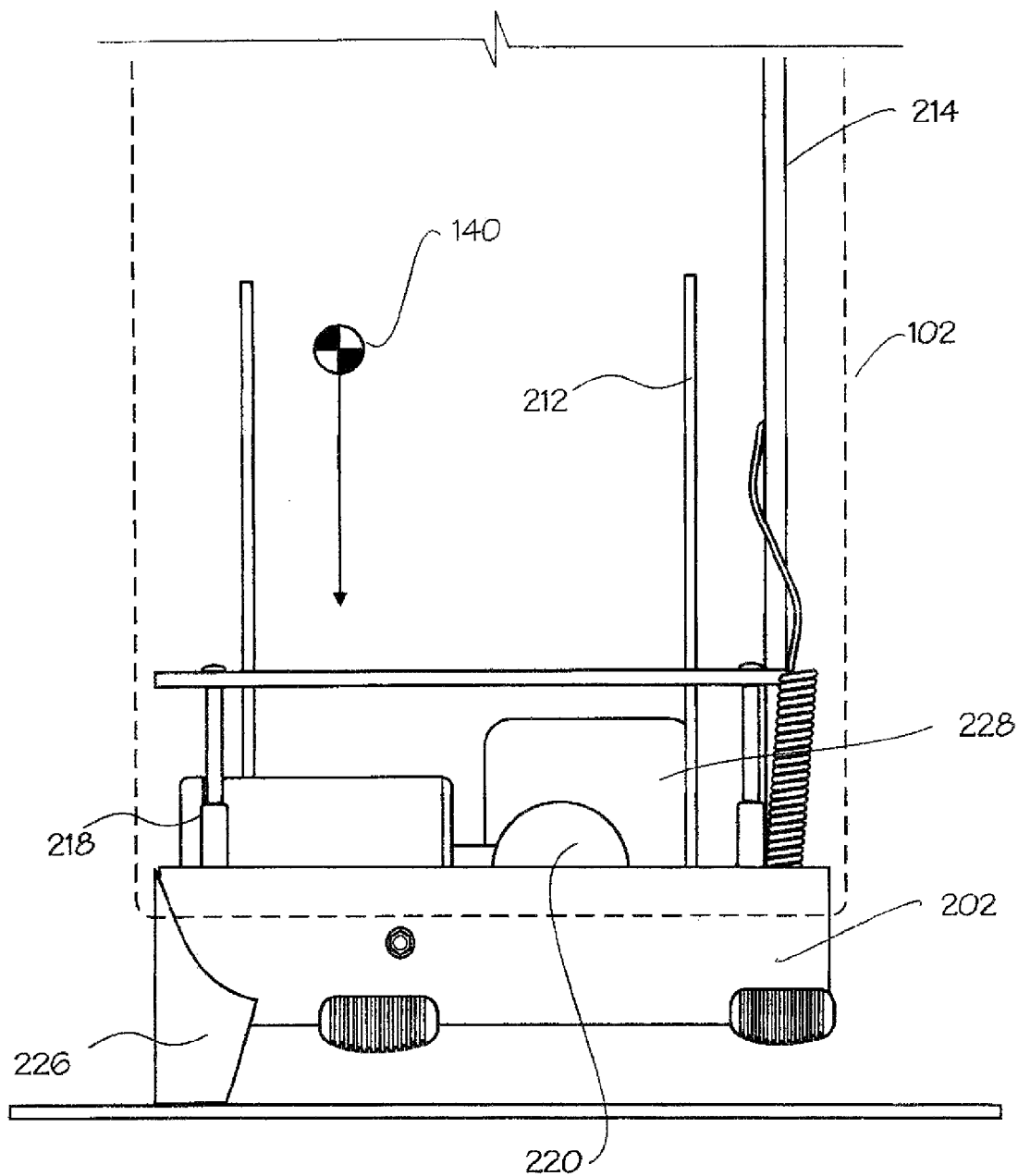
FIG. 4 is a partial side elevational view of the removable drive shown together with the outer shell of a golf bag displayed in dashed lines.
Figure 8:
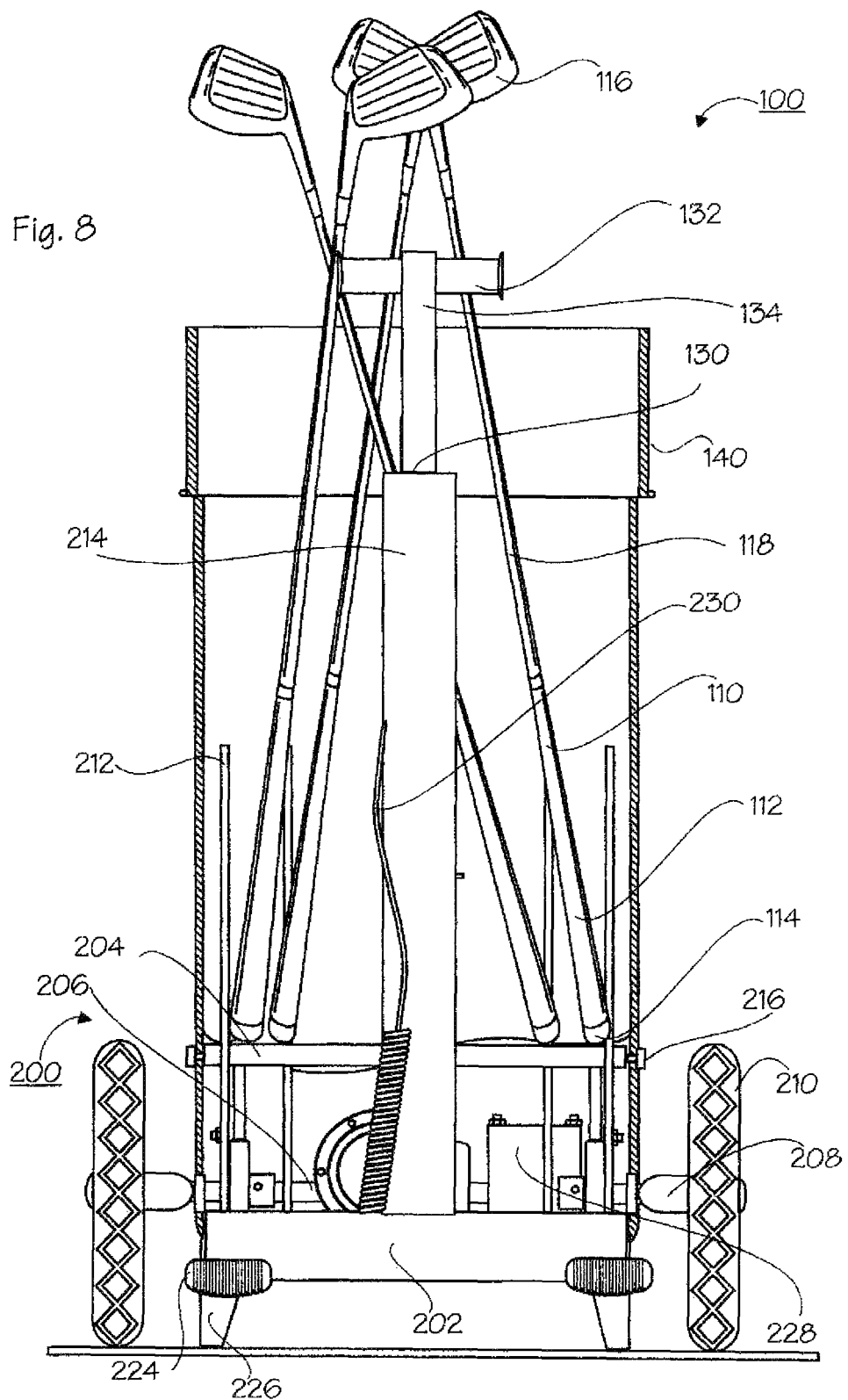
FIG. 8 is a front schematic elevational with the golf bag in cross section and showing the interior of the combination golf cart and bag showing the outer shell of the golf bag in place.

Referring first of all to FIG. 8 the present device a combination golf cart and bag as shown generally 100 includes the following major components namely a removable drive 200 shown in FIG. 1 disassembled from the combination golf cart and bag as well as the golf outer shell 102 of golf bag 104 mounted and assembled onto a removable drive 200.

Now referring to FIGS. 1 through 4 which best display the components of removable drive 200 which includes the following major components namely lower frame 202 upper frame 204 drive axle 206 connected to hubs 208 and wheels 210.

Removable drive 200 further includes upright supports 212 a spine member 214 bag fasteners 216 a motor 218 a transmission 220 which is connected to the drive axle 206 and is supported with bearings 222.

Lower frame 202 includes outer bumpers 224 legs 226 and have mounted thereon a battery 228.

A cable 230 runs from the electrical components mounted onto lower frame 202 up to a control panel 232 located in handle 234.

Referring now to FIG. 8 showing the combination golf cart and bag generally as 100 the reader will note that outer shell 102 of golf bag 104 is mounted overtop of removable drive 200 and fastened together with bag fasteners 216.

The outer periphery of upper frame 204 approximately follows the contour of outer shell 102 of golf bag 104 such that outer shell 102 is in contact with the outer periphery of upper frame 204 around its entire periphery. A number of bag fasteners 216 may be employed in order to ensure a secure attachment between outer shell 102 and removable drive 200.

In addition additional fasteners not shown in the diagrams may be included to fasten the outer shell 102 to lower frame 202 such that it is securely attached to removable drive 200.

In FIG. 8 combination golf cart and bag 100 additionally shows how upper frame 204 acts as a false bottom and/or hidden bottom in golf bag 104 such that handle ends 114 of club handle 112 rest on upper frame 204.

FIG. 8 furthermore shows golf clubs 110 having club shafts 118 and club heads 116. Golf clubs 110 rest partially within the interior of outer shell 102 of golf bag 104.

The reader will note from FIG. 8 that spine member 214 stands uprightly internally of outer shell 102 and connects to handle 234 at a lower end 130 to spine member 214. Handle 234 additionally includes a handgrip 132.

FIG. 8 also indicates that golf bag 104 can include a bag collar 140 which can rigidly support golf clubs 110 stored within outer shell 102 of golf bag 104.

Figure 5:
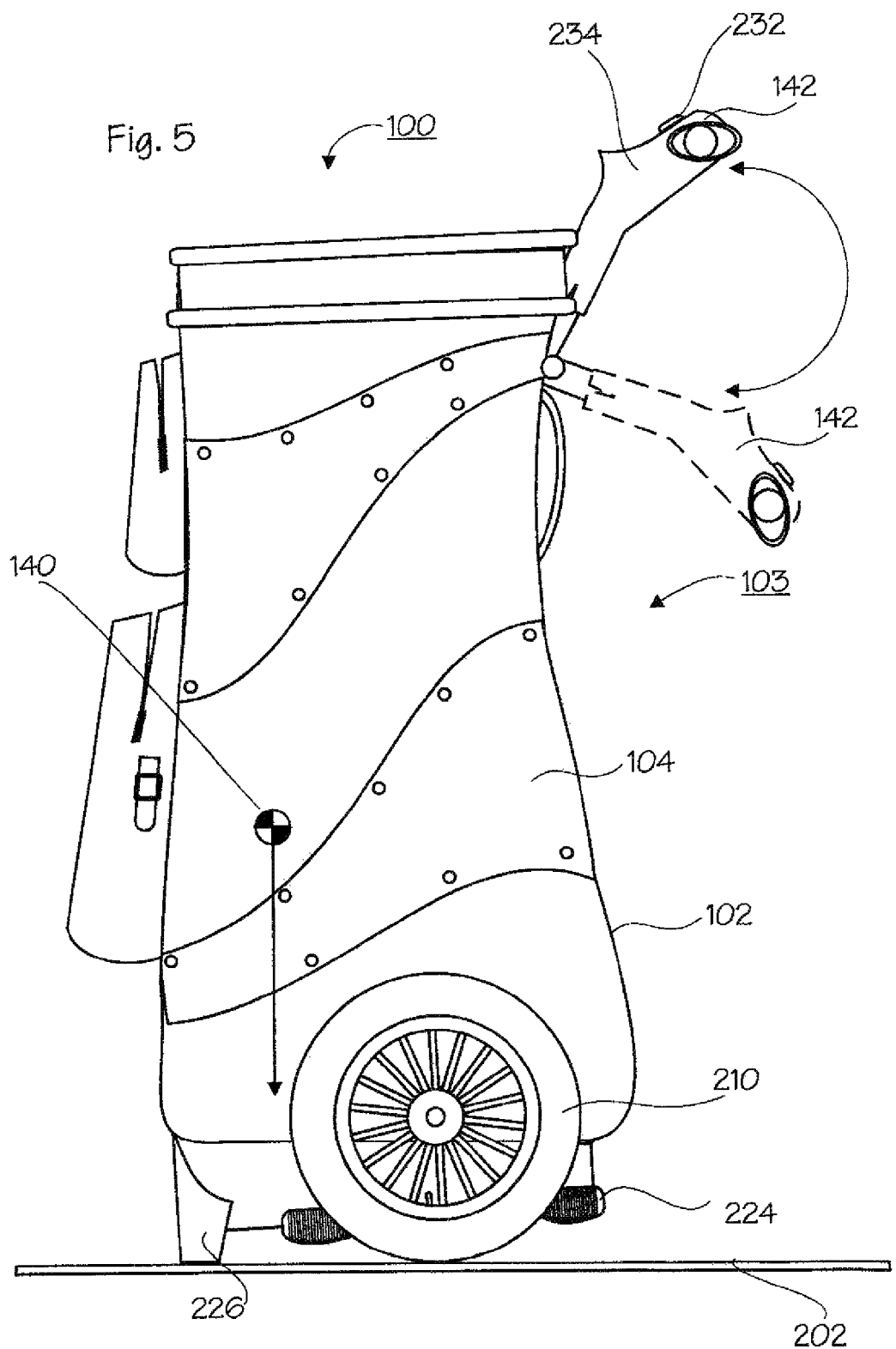
FIG. 5 is a schematic side elevational view of the combination golf cart and bag showing the handle in the upright position as well as in the collapsed position in dashed lines
Figure 6:
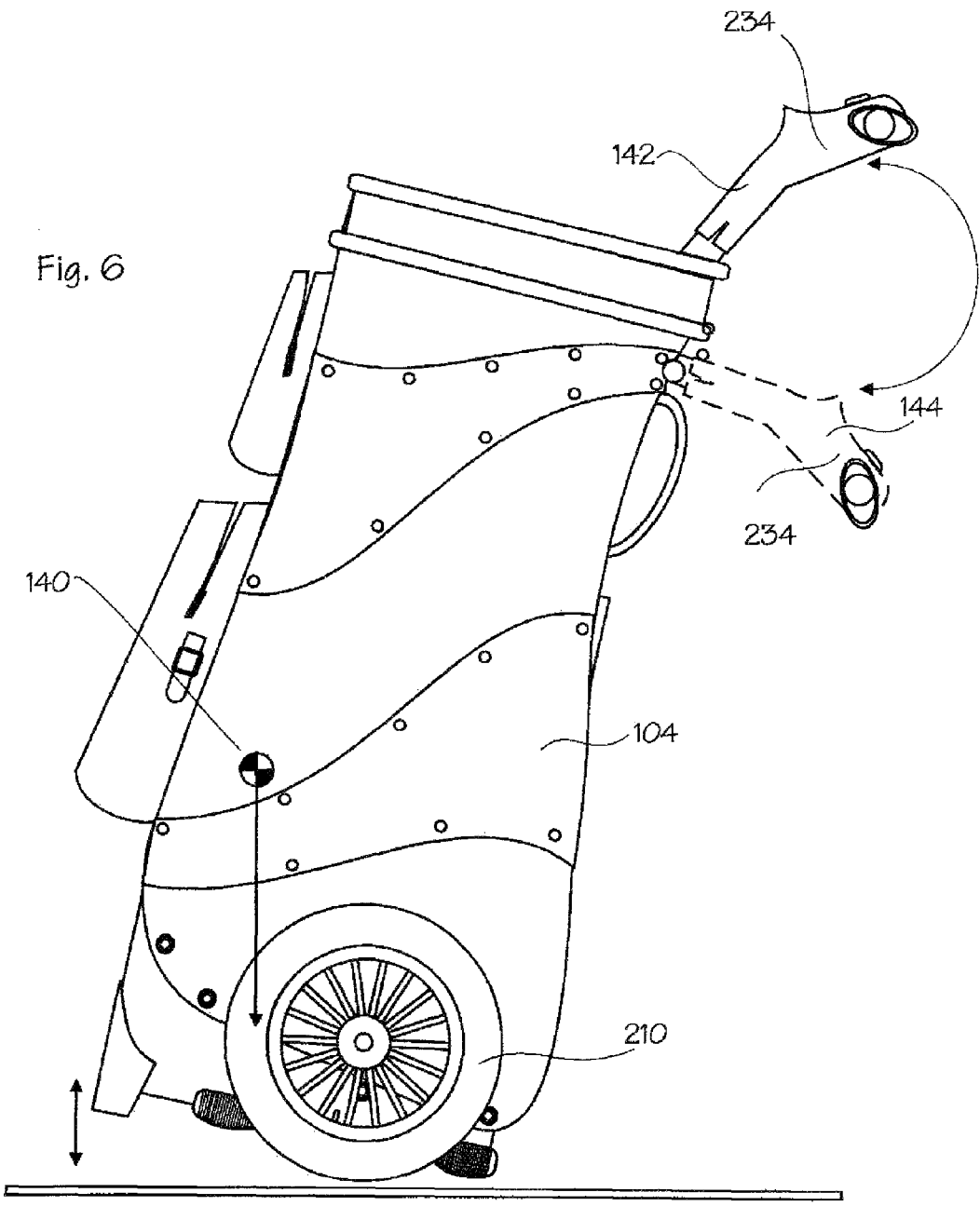
FIG. 6 is a schematic side elevational view of the combination golf cart and bag with the handle shown in the upright position as well as in the collapsed position in dashed lines
Figure 7:
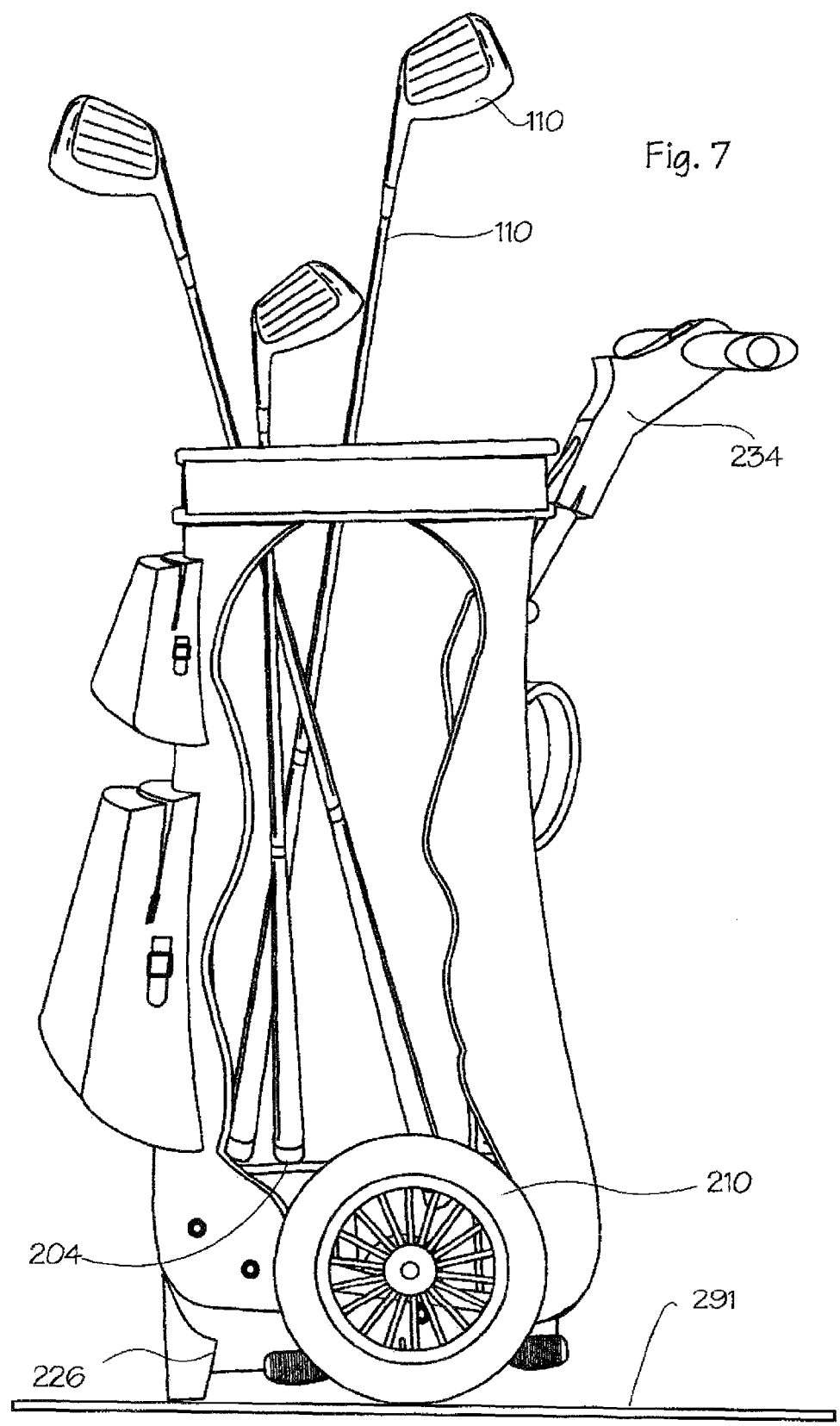
FIG. 7 is a schematic partial cut away side view of the combination golf cart and bag showing the golf clubs stored partially within the golf bag.

Referring now to FIG. 5, combination golf cart and bag as shown generally as 100 depicts handle 234 in an upright position 142 and in dashed lines in a collapsed position 144. FIG. 5 also depicts a centre of gravity shown as 140 in FIG. 5 such that the internal componentry removable drive 200 in particular the heavy components such as motor 218 transmission 220 and battery 228 are mounted in such an arrangement in removable drive 200 such that the centre of gravity 140 is ahead of drive axle 206 such that the bag is normally resting upon legs 226 as depicted in FIG. 5. The reader will note that no further supports or bracing arms or legs are required in order for combination golf cart and bag shown generally as 100 to be free standing.

FIG. 5 shows combination golf cart and bag in the free-standing position 103 resting normally on legs 226.

In Use

The combination golf cart and bag 100 can be purchased in assembled condition as shown in schematic fashion in FIG. 8. In this condition the outer shell 102 of golf bag 104 has been mounted over top of and onto removable drive 200 as shown in the position in FIG. 8. It is possible for the user to remove outer shell 102 of golf bag 104 from removable drive 200 by removing bag fasteners 216 and thereby lifting outer shell 102 of golf bag 104 away from and detaching it from removable drive 200.

In the assembled position as shown in FIG. 8 upper frame 204 acts as a false bottom for supporting golf clubs 110 thereon.

The user will use combination golf cart and bag 100 in the traditional fashion as any other golf bag with the major differences being that removable drive 200 is integrally part of the entire combination golf cart and bag 100 and provides for a drive mechanism for motorizing the drive of combination golf cart and bag 100.

The user for maintenance purposes can simply remove bag fasteners 216 and separate golf bag 104 from removable drive 200 for maintenance and for other purposes.

Wheels 210 are designed such that they are easily removed from hubs 208 for more compact storage and placement of combination golf cart and bag 100 into vehicles for example or for other storage locations.

The major components of removable drive 200 namely motor 218 transmission 220 and battery 228 are mounted onto lower frame 202 in rigid fashion In addition spine member 214 is also mounted onto lower frame and also mounted and supported to upper frame 204 therefore providing for a rigid spine member 214 which is ultimately connected to handle 234 for pulling or manipulating the cart manually.

The structural components of combination golf cart and bag 100 are for the most part hidden under outer shell 102 of golf bag 104 in that spine member 214, upright supports 212 as well as upper frame 204 and lower frame 202 and all components mounted thereon are housed within outer shell 102 of golf bag 104.

In addition uprights supports 214 provide for shape support of outer shell 102 therefore maintaining the shape of the golf bag.

Description of an Alternate Preferred Embodiment

Figure 15:
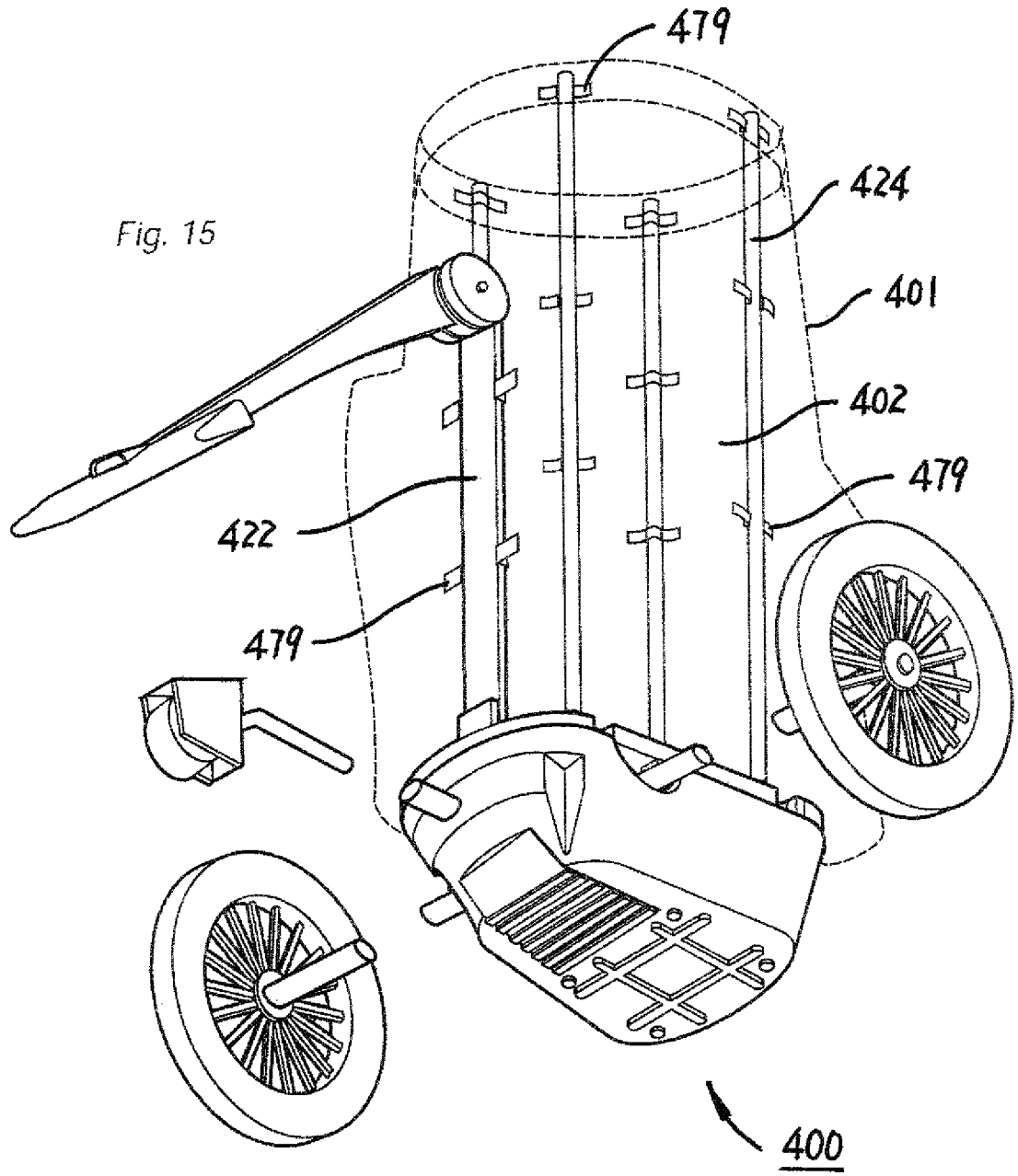
FIG. 15 is a schematic exploded view of the drive housing together with some frame components together with the outline of a golf bag in dashed lines.
Figure 16:
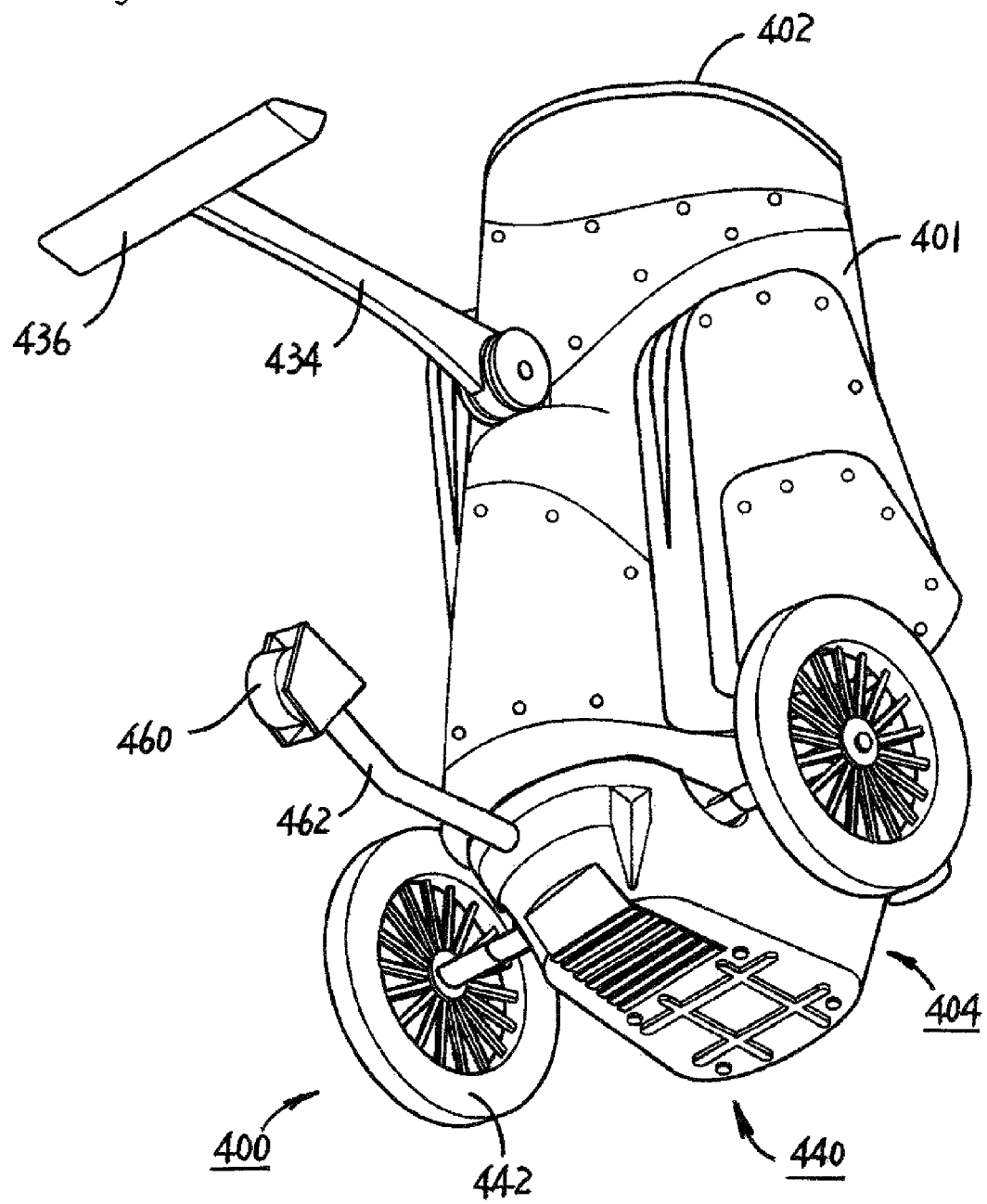
FIG. 16 is a bottom schematic perspective view of a golf bag with drive shown in a fully assembled condition.
Figure 17:
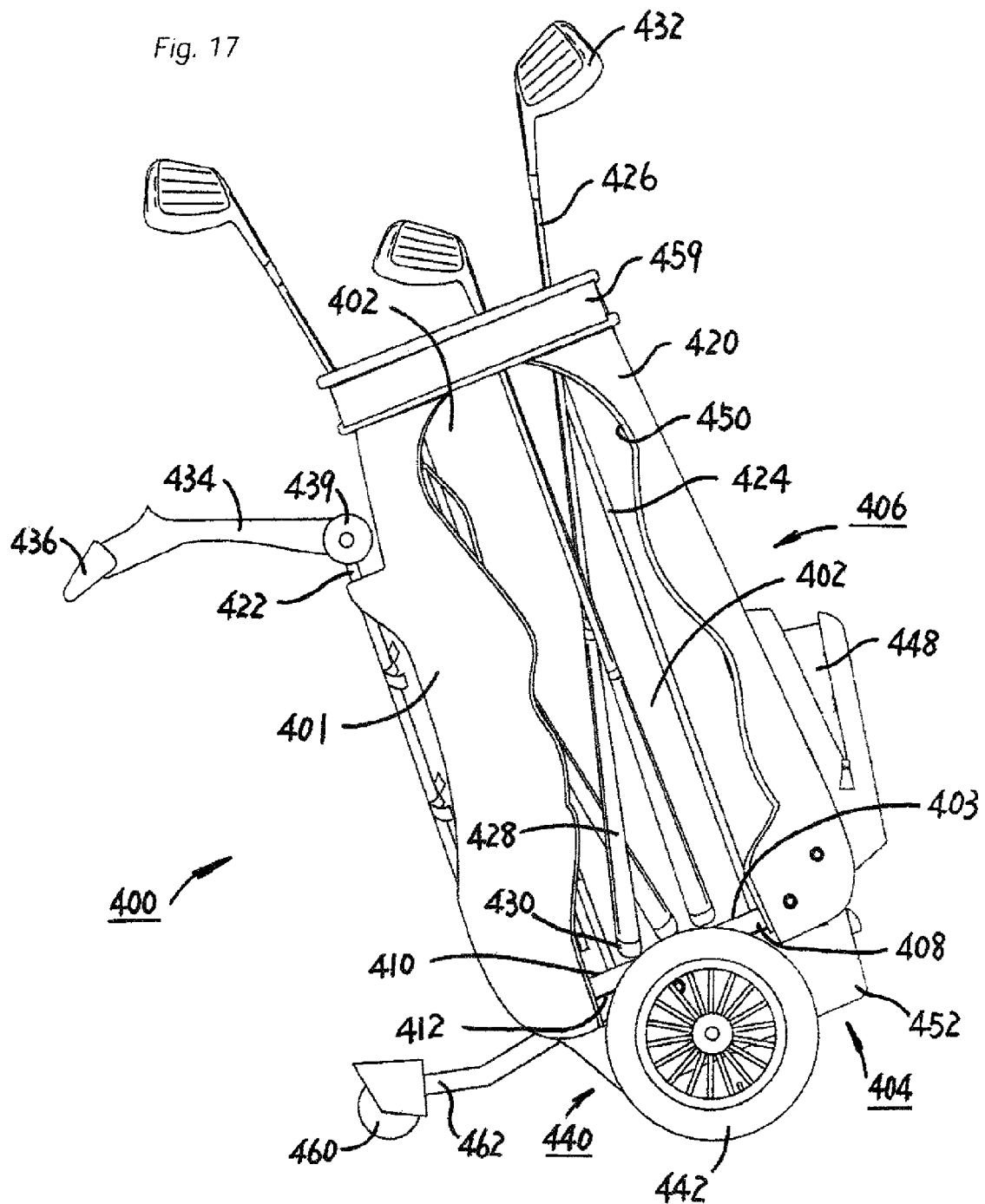
FIG. 17 is a side partial cut away elevational schematic view of a golf bag with drive revealing the golf club housing.

Referring now to FIGS. 9 through 17 which depict an alternate preferred embodiment namely a golf bag with drive shown generally as 400 in FIG. 17 which includes a golf club housing 402 and a drive housing 404.

Figure 9:
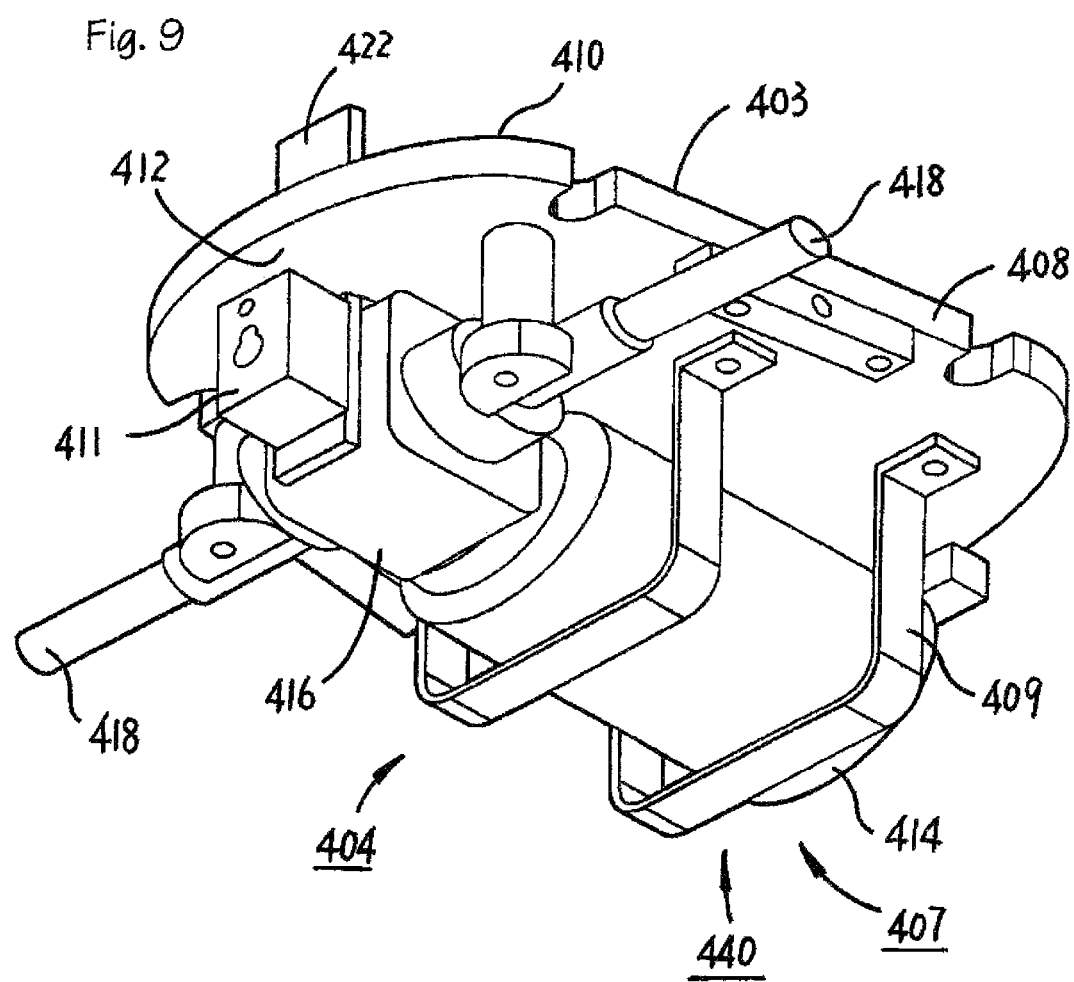
FIG. 9 is a bottom schematic perspective view of the drive housing showing the drive components.

Referring first of all to FIG. 9 which show the components within drive housing 404 namely the drive components 440 are mostly housed within drive housing 404.

In particular drive 407 includes drive components 440 housed within drive housing 404 include a motor 414 connected to a transmission 416 which is operably connected to a drive axle 418 which in turn drives the wheel 442. These drive components 440 are mounted to a drive base 408 with brackets 409. Drive base 408 has a top side 410 and a bottom side 412.

Additionally spine member 422 as well as support arm block 411 are also connected to drive base 408 as shown in FIG. 9.

The reader will note that the top side 410 of drive base 408 defines a bottom surface 403 of golf club housing 402 which is shown in FIG. 17.

Figure 10:
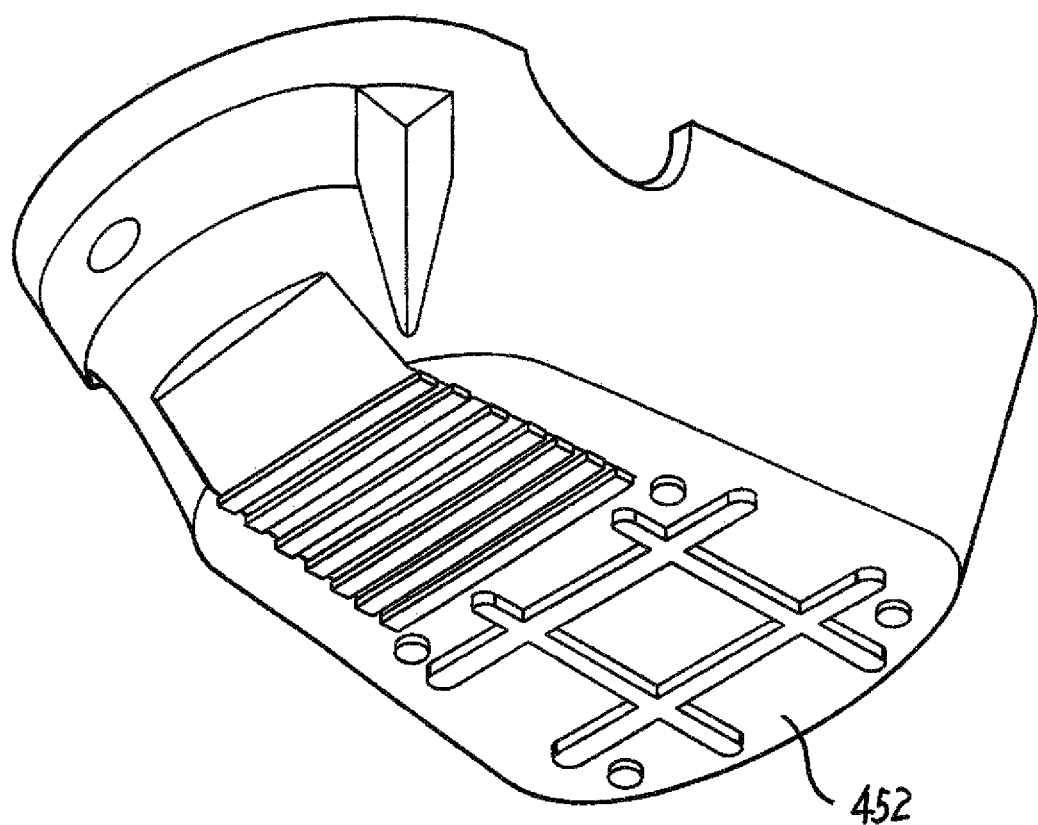
FIG. 10 is a bottom schematic perspective view of the drive end cap.
Figure 11:
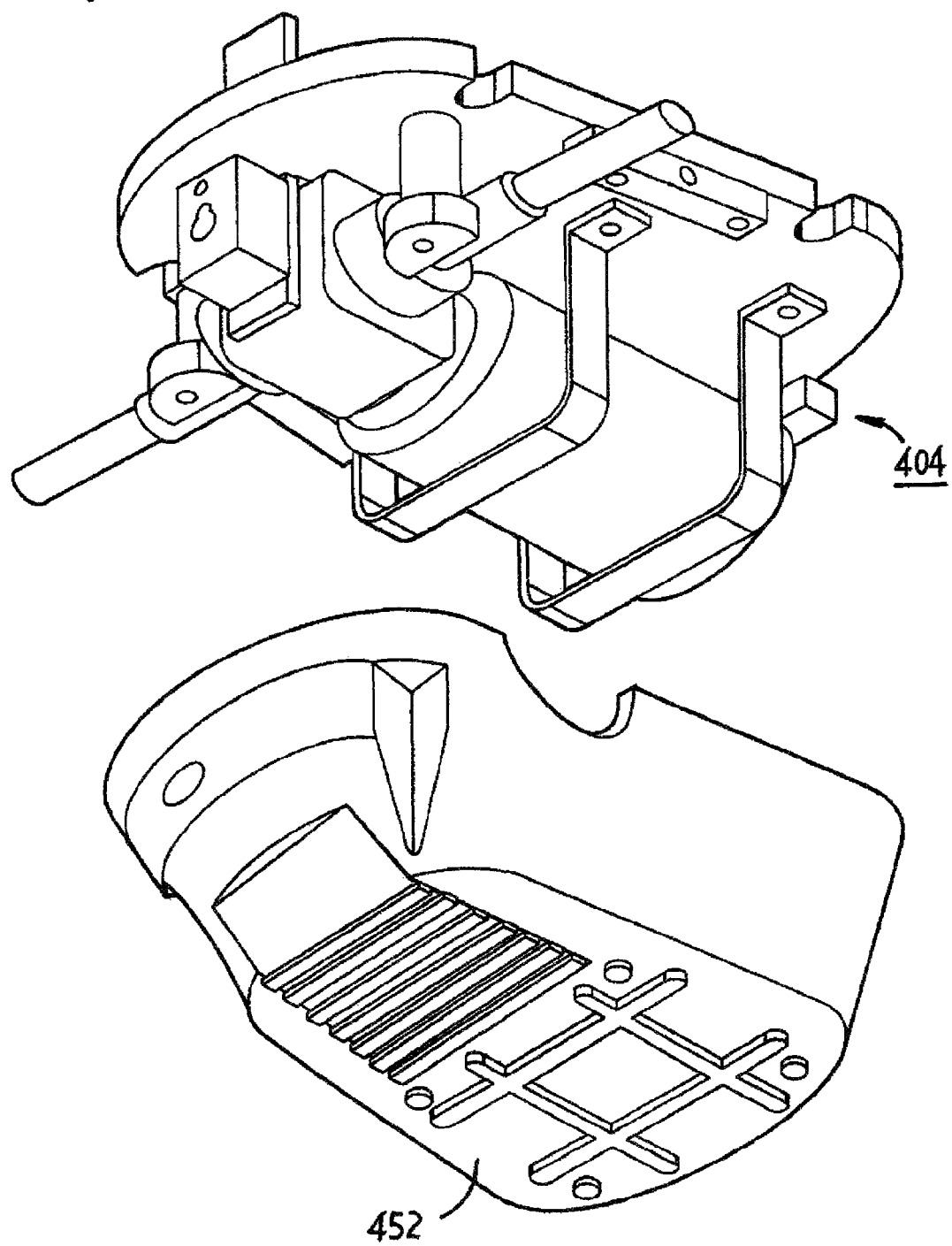
FIG. 11 is a schematic perspective exploded view of the drive housing and a drive end cap.

Referring now to FIGS. 10 and 11 drive housing 404 is covered over with a drive end cap 452 shown in FIG. 10 and shown in exploded fashion FIG. 11 wherein drive end cap 452 fits releasably over drive housing 404 and is releasably connected to drive base 408.

Figure 12:
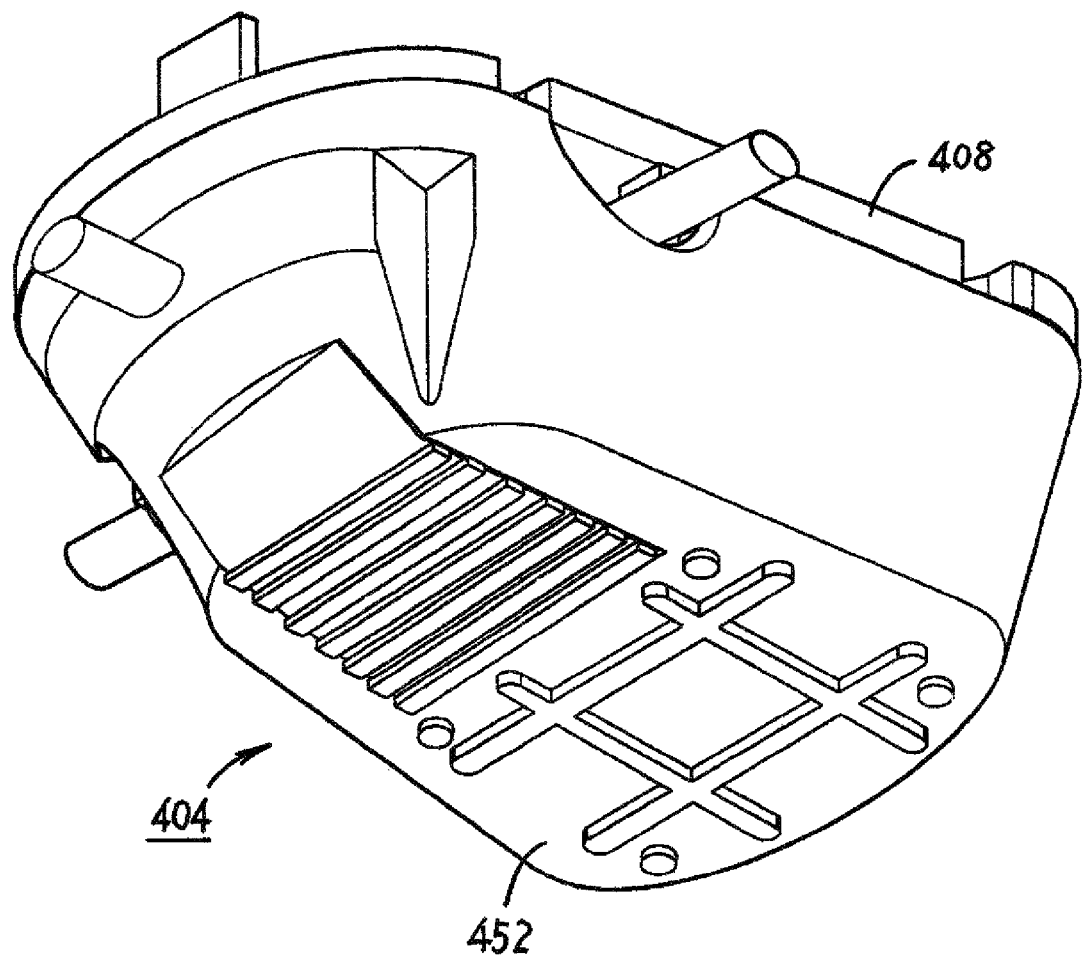
FIG. 12 is a schematic perspective assembled view of the drive end cap onto the drive housing.

Drive end cap 452 is shown assembled overtop of drive housing 404 and connected to drive base 408 in FIG. 12.

Figure 13:
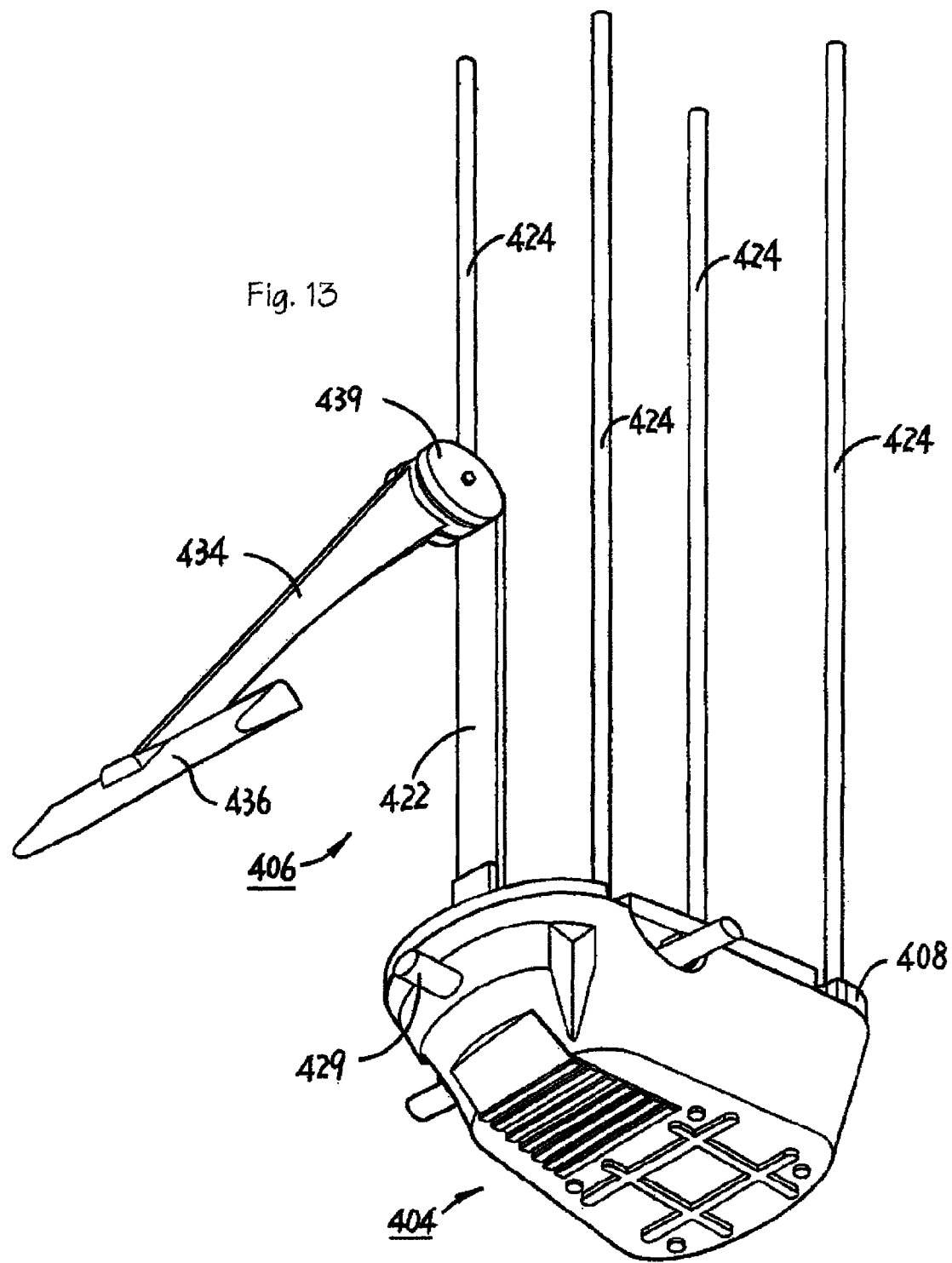
FIG. 13 is a schematic perspective view of the drive housing together with the frame components.

Referring now to FIG. 13 which schematically in perspective view show some of the frame components 406 together with the drive housing 404.

Upright struts 424 mounted on to drive base 408 as well as spine member 422.

Upright struts 424 and spine member 422 extend upwardly in order to support outer shell 420 of golf bag 401.

In addition spine member 422 includes a pivot 439 which is connected to a handle 434 which in turn is connected to grip 436. Handle 434 can be pivoted from an extended position to a folded position using pivot 439.

Additionally support arm connector 429 is connected to support arm block 411 which in turn is connected to drive base 408. Support arm connector 429 is used to connect support arm 462 to drive base 408.

Figure 14:
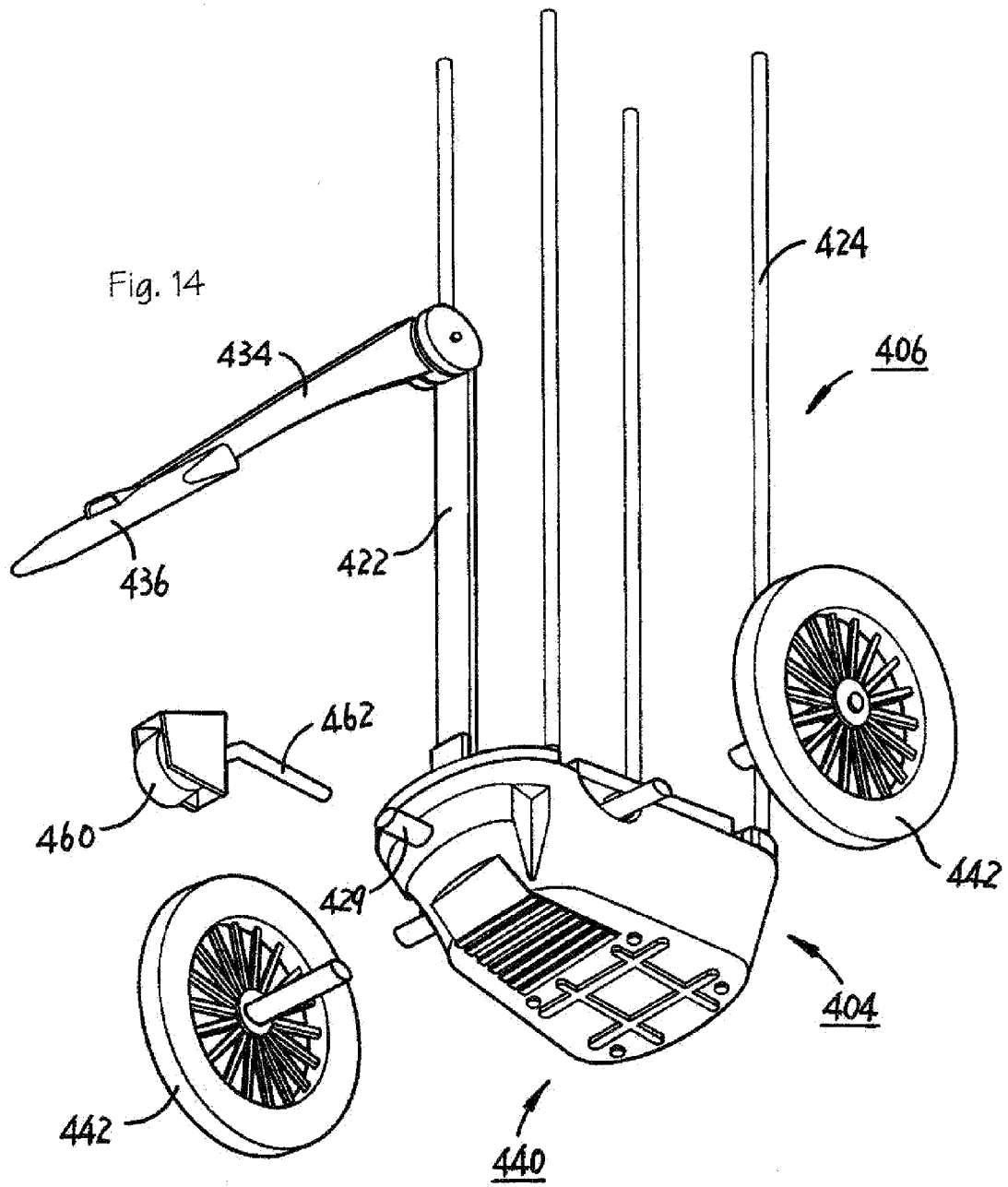
FIG. 14 is a schematic exploded perspective view of the drive housing showing the drive components together with the frame components.

FIG. 14 shows in exploded fashion additional drive components 440 namely support arm 462 and support wheel 460 as well as wheels 442 which are demountably attached to drive axle 418.

The reader will note that support arm 462 is demountably attached to support arm connector 429 as well as wheels 442 are demountably attached to drive axle 418.

FIGS. 15 and 17 schematically depicts an outline of a golf bag 401 and its relationship to the frame components namely upright struts 424 and spine member 422 and drive housing 404.

Golf bag 401 also defines a golf club housing 402 which stores golf clubs 426.

Referring now to FIG. 16 which shows in fully assembled fashion in schematic perspective view the golf bag with drive generally as 400 which includes the following major components namely golf bag 401 which defines a golf bag housing 402 and a drive housing 404 which contains most of the drive components 440 as well as handle 434, grip 436, support arm 462, support wheel 460 and wheels 442.

Referring now to FIG. 17 which shows a partial cut away side schematic view the golf bag with drive shown generally as 400 as well as FIG. 15.

Golf bag with drive 400 includes the following major components namely golf bag 401 which defines a golf club housing 402 and a drive housing 404 which houses most of the drive components 440.

Golf club housing 402 is separated from drive housing 404 with a drive base 408 which has a top side 410 and a bottom side 412. The top side 410 of drive base 408 defines a bottom surface 403 of golf club housing 402 which supports the butt end 430 of golf clubs 426 when they are stored within golf club housing 402.

Golf bag 401 is made up of an outer shell 420 which is normally a flexible material having an inner surface 450 and a bag collar 459 made of stiffer material. Golf bag 400 also includes frame components 406 which are mounted to drive base 408 and extend vertically upward to support the outer shell 420 of golf bag 401.

In particular frame components 406 include upright struts 424 which are connected at one end to drive base 408 and preferably extend vertically upward to the top of bag collar 459 of golf bag 401. Preferably these upright struts 424 are connected to the inner surface 450 of outer shell 420 with attachment strips 479 thereby supporting golf bag 401.

Additionally frame components 406 also include a spine member 422 which is connected at one end to the drive base 408 and extends vertically upwardly again supporting the outer shell 420 of golf bag 401. Person skilled in the art will note that there are many known ways which will attach upright struts 424 and spine member 422 to inner surface 450 of outer shell 420.

Spine member also is attached at one end to a pivot 439 which in turn is attached to a handle 434 and a grip 436 for guiding the golf bag with drive 400.

Golf club 426 usually includes a club head depicted as 432, club handle depicted as 428 and a butt end 430. Golf clubs 426 are normally stored in the inverted position as shown in FIG. 17. The butt end 430 of golf club 426 rests and is supported by bottom surface 403 of golf club housing 402. Bottom surface 403 is the top side 410 of drive base 408.

Drive components 440 also include wheels 442 which are detachably mounted onto the drive axles 418 as depicted in FIG. 9 as well as drive end cap 452 which covers over drive housing 404.

Additionally support wheel 460 is connected to support arm 462 which is detachably mounted to drive base 408.

A battery 448 may be housed conveniently in one of the pockets or elsewhere on a golf bag with drive 400 and is one of the drive components 440 which may or may not be housed within drive housing 404.

In use the reader will note that golf bag 401 defines a golf club housing 402 and has a bottom surface 403 which is the top side 410 of drive base 408. Drive base 408 separates the upper golf club housing 402 from the lower drive housing 404.

The outer shell 420 of golf bag 401 is supported with frame components 406 in particular upright struts 424 and spine member 422 support and maintain the shape of the outer shell 420 of golf bag 401.

Most of the drive components 440 are housed within drive housing 404 including a motor 414, a transmission 416 and the drive axle 418.

A support arm 462 and support wheel 460 as well as the wheels 442 are releaseably mounted onto the drive housing 404 for easy storage of the golf bag with drive 400.

In addition the drive end cap 452 is releaseably mounted onto drive base 408 for servicing of the drive components 440.

For the purposes of storage the handle 434 and grip 436 can be folded away. Support wheel 460 and support arm 462 as well as the wheels 442 are easily detached from the drive housing 404 for storage.

A control not shown which includes a battery for motor 414 is located in a convenient location for controlling the function of the drive and operation of motor 414. Motor 414 will propel the golf bag with drive in the same manner as a motorized cart for use with a golf bag currently operates. The drive functions may include forward and reverse controls, speed control and may also include a shut off timer.

It should be apparent to persons skilled in the art that various modifications and adaptations of the structure described above are possible without departure from the spirit of the invention and the scope of which is defined in the appended claims.

I claim:

1. A golf bag with an integral drive for propelling the golf bag, the golf bag comprising:
   a) a golf bag which includes an upper golf club housing connected to a lower drive housing;
   b) the golf bag includes an outer shell and internal frame components supporting the outer shell;
   c) the frame components including a drive base connected to the bag for rigidly mounting drive components thereto;
   d) a drive including a motor mounted to the drive base, the motor operably connected to a drive axle which is connected to wheels for propelling the golf bag;
   e) a control means for controlling the function of the drive;
   f) wherein the drive base separates the upper golf club housing from the lower drive housing;
   g) wherein the drive base includes a top side which defines a bottom surface of the golf club housing for supporting butt ends of golf clubs thereon, and a bottom side for mounting the drive components thereon.

2. The golf bag with an integral drive claimed in claim 1 wherein the frame components include a spine member rigidly connected to the drive base which extends upwardly along an inner surface of the golf bag outer shell for supporting the outer shell.

3. The golf bag with an integral drive claimed in claim 2 wherein the frame components including at least one upright strut member rigidly connected to the drive base and extends upwardly along an inner surface of the golf bag outer shell for supporting the outer shell.

4. The golf bag with an integral drive claimed in claim 3 wherein the spine and struts are operably connected to an inner surface of the outer shell for supporting and maintaining the shape of the outer shell.

5. The golf bag with an integral drive claimed in claim 4 wherein the frame including a foldable handle connected pivotally at one end to a top of the spine member and at the other end to a grip.

* * * * *